United States Patent
Binek et al.

(10) Patent No.: US 12,066,188 B2
(45) Date of Patent: Aug. 20, 2024

(54) MODULAR INJECTOR BOLT FOR AN ENGINE

(71) Applicant: Raytheon Technologies Corporation, Farmington, CT (US)

(72) Inventors: Lawrence A. Binek, Glastonbury, CT (US); Sean R. Jackson, Palm City, FL (US); Jose R. Paulino, Jupiter, FL (US); Anthony Van, Palm City, FL (US); Timothy S. Snyder, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 8 days.

(21) Appl. No.: 17/214,730

(22) Filed: Mar. 26, 2021

(65) Prior Publication Data
US 2022/0307694 A1    Sep. 29, 2022

(51) Int. Cl.
*F23R 3/28*    (2006.01)

(52) U.S. Cl.
CPC .... *F23R 3/283* (2013.01); *F23R 2900/00012* (2013.01)

(58) Field of Classification Search
CPC ............... F23R 3/346; F23R 3/283; F23R 2900/00012; F23R 2900/00017; F23R 3/28; F23R 3/34; F23R 3/36; F02C 7/222; F02C 7/22; F23D 11/38
See application file for complete search history.

(56) References Cited

U.S. PATENT DOCUMENTS

| | | | |
|---|---|---|---|
| 4,057,371 A * | 11/1977 | Pilarczyk | F04D 29/0513 417/409 |
| 4,898,329 A | 2/1990 | Davis | |
| 6,253,555 B1 * | 7/2001 | Willis | F23R 3/346 60/737 |
| 6,931,862 B2 | 8/2005 | Harris | |
| 9,062,609 B2 | 6/2015 | Mehring | |
| 10,060,628 B2 | 8/2018 | Johnson | |
| 11,053,854 B1 * | 7/2021 | Mcintyre, II | F23R 3/283 |
| 2010/0071377 A1 * | 3/2010 | Fox | F23R 3/346 60/740 |
| 2010/0229557 A1 * | 9/2010 | Matsumoto | F23R 3/34 60/737 |
| 2013/0031908 A1 | 2/2013 | Dicintio | |

(Continued)

OTHER PUBLICATIONS

EP search report for EP22164852.0 dated Aug. 18, 2022.
EP Search Report for EP Patent Application No. 24160061.8 dated Apr. 22, 2024.

*Primary Examiner* — William H Rodriguez
(74) *Attorney, Agent, or Firm* — Getz Balich LLC

(57) ABSTRACT

An assembly is provided for an engine. This engine assembly includes an engine structure and a fuel injector. The engine structure includes an injector aperture and a fuel supply passage. The injector aperture extends longitudinally through the engine structure along a centerline. The fuel supply passage extends laterally within the engine structure to the injector aperture. The fuel injector is mated with the injector aperture. The fuel injector includes a nozzle passage and a nozzle orifice. The nozzle passage extends longitudinally along the centerline within the fuel injector to the nozzle orifice. The nozzle passage is fluidly coupled with the fuel supply passage.

19 Claims, 13 Drawing Sheets

(56) References Cited

U.S. PATENT DOCUMENTS

| | | |
|---|---|---|
| 2013/0104553 A1 | 5/2013 | Stoia |
| 2013/0283807 A1* | 10/2013 | Stoia .................... F23R 3/34 |
| | | 60/746 |
| 2014/0097276 A1 | 4/2014 | Boardman |
| 2014/0196465 A1 | 7/2014 | Laster |
| 2014/0352312 A1 | 12/2014 | Beck |
| 2015/0362194 A1 | 12/2015 | Ogata |
| 2020/0332719 A1 | 10/2020 | Binek |
| 2020/0398386 A1 | 12/2020 | Binek |
| 2020/0400314 A1 | 12/2020 | Binek |
| 2023/0266008 A1* | 8/2023 | Binek ................. F23R 3/346 |
| | | 60/438 |

\* cited by examiner

MODULAR INJECTOR BOLT FOR AN ENGINE

BACKGROUND OF THE DISCLOSURE

1. Technical Field

This disclosure relates generally to fuel delivery and, more particularly, to a fuel injector for an engine.

2. Background Information

A typical gas turbine engine includes an array of fuel injectors. The fuel injectors are operable to inject fuel into a chamber of a combustor for combustion. The fuel injectors are located radially within an engine casing. Each fuel injector may be L-shaped with a radially extending support arm and an axially extending nozzle at an inner end of the support arm. The support arm is secured to the engine casing and the nozzle is mated with a respective opening in a bulkhead of the combustor. While such known fuel injectors have various benefits, these fuel injectors may be cumbersome to install and may require significant engine disassembly for fuel injector inspection, maintenance and/or replacement.

It is also known in the art to form a fuel injector with a surrounding engine casing as a unitary body. While such an integral fuel injector configuration may simplify engine assembly, the fuel injector cannot be replaced without also replacing or modifying the engine casing.

There is a need in the art for a modular/replaceable fuel injector which, for example, can simplify fuel injector installation, inspection and/or replacement.

SUMMARY OF THE DISCLOSURE

According to an aspect of the present disclosure, an assembly is provided for an engine. This engine assembly includes an engine structure and a fuel injector. The engine structure includes an injector aperture and a fuel supply passage. The injector aperture extends longitudinally through the engine structure along a centerline. The fuel supply passage extends laterally within the engine structure to the injector aperture. The fuel injector is mated with the injector aperture. The fuel injector includes a nozzle passage and a nozzle orifice. The nozzle passage extends longitudinally along the centerline within the fuel injector to the nozzle orifice. The nozzle passage is fluidly coupled with the fuel supply passage.

According to another aspect of the present disclosure, another assembly is provided for an engine. This engine assembly includes a fuel supply apparatus and a fuel injector. The fuel supply apparatus includes an injector aperture and a fuel supply passage. The injector aperture extends longitudinally through the fuel supply apparatus along a centerline. The fuel supply passage extends laterally within the fuel supply apparatus to the injector aperture. The fuel injector is mated with the injector aperture. The fuel injector includes a nozzle passage and a nozzle orifice. The nozzle passage extends longitudinally along the centerline within the fuel injector to the nozzle orifice. The nozzle passage is fluidly coupled with the fuel supply passage.

According to still another aspect of the present disclosure, a fuel injector is provided for an engine. This fuel injector includes a fuel injector body. The fuel injector body extends longitudinally along a centerline between a fuel injector first end and a fuel injector second end. The fuel injector body includes a mount, a fuel nozzle, a fuel coupler and a nozzle passage. The mount includes a threaded exterior. The fuel nozzle includes a nozzle orifice. The nozzle passage extends longitudinally along the centerline within the fuel injector body to the nozzle orifice. The nozzle orifice is disposed at the fuel injector second end. The fuel coupler is arranged longitudinally along the centerline between the mount and the fuel nozzle. The fuel coupler includes a port and an internal volume. The port extends laterally into the fuel injector body to the internal volume. The internal volume is fluidly coupled with and between the port and the nozzle passage.

The engine assembly may also include a fuel conduit and/or an engine structure wall. The fuel conduit may be attached to the fuel supply apparatus. The fuel conduit may be configured to provide fuel to the fuel injector through the fuel supply passage. The fuel supply apparatus may be configured as a boss projecting longitudinally out from the engine structure wall.

The injector aperture may extend longitudinally through the engine structure along the centerline between a first end and a second end. The fuel supply passage may extend laterally within the engine structure to an intermediate region of the injector aperture located longitudinally along the centerline between the first end and the second end.

The fuel injector may be attached to the engine structure by a threaded interface.

The fuel injector may be configured to be installed with or removed from the engine structure completely from an exterior of the engine structure.

The fuel injector may include a base and a head connected to the base. The base may project longitudinally along the centerline into the injector aperture. The head may be abutted longitudinally against a surface of the engine structure.

The fuel injector may include a fuel nozzle and a fuel coupler. The fuel nozzle may include the nozzle passage and the nozzle orifice. The fuel coupler may be within the injector aperture adjacent the fuel supply passage. The fuel coupler may be configured to fluidly couple the fuel supply passage with the nozzle passage.

The fuel coupler may include a tubular sidewall and a chamber within the tubular sidewall. A port may extend laterally through the tubular sidewall. The port may be at least partially aligned with an orifice to the fuel supply passage. The chamber may be fluidly coupled with and between the port and the nozzle passage.

The fuel coupler may include a first end wall, a second end wall and a plurality of struts. The struts may be arranged circumferentially about the centerline. The struts may be connected to and extend longitudinally along the centerline between the first end wall and the second end wall.

The fuel coupler includes a plurality of ports and an internal chamber. Each of the ports may be formed circumferentially between a respective adjacent pair of the struts. A first of the ports may be at least partially aligned with an orifice to the fuel supply passage. The struts may be arranged circumferentially around the internal chamber. The internal chamber may be fluidly coupled with and between the ports and the nozzle passage.

A first of the struts may have an elongated cross-sectional geometry.

A first of the struts may have and may extend along a strut centerline between the first end wall and the second end wall. At least a portion or an entirety of the strut centerline may follow a straight trajectory or a non-straight trajectory.

The engine assembly may also include a first seal element and/or a second seal element. The first seal element may be within the injector aperture. The first seal element may be laterally between and sealingly engaged with the fuel injector and the engine structure. The second seal element may be within the injector aperture. The second seal element may be laterally between and sealingly engaged with the fuel injector and the engine structure. A port in the fuel coupler may be located longitudinally along the centerline between the first seal element and the second seal element. The port may fluidly couple the fuel supply passage with the nozzle passage.

The fuel coupler may include a tubular sidewall extending circumferentially around the internal volume. The port may extend laterally through the tubular sidewall.

The fuel coupler may include a first end wall, a second end wall and a plurality of struts. The struts may be arranged circumferentially about the centerline and the internal volume. The struts may be connected to and may extend longitudinally along the centerline between the first end wall and the second end wall. The port may be formed circumferentially between a respective adjacent pair of the struts.

A first of the struts may have a double-tapered cross-sectional geometry.

A first of the struts may follow a non-straight trajectory or a straight trajectory.

The engine may be a gas turbine engine. The engine structure may be configured as or otherwise include a case of the gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
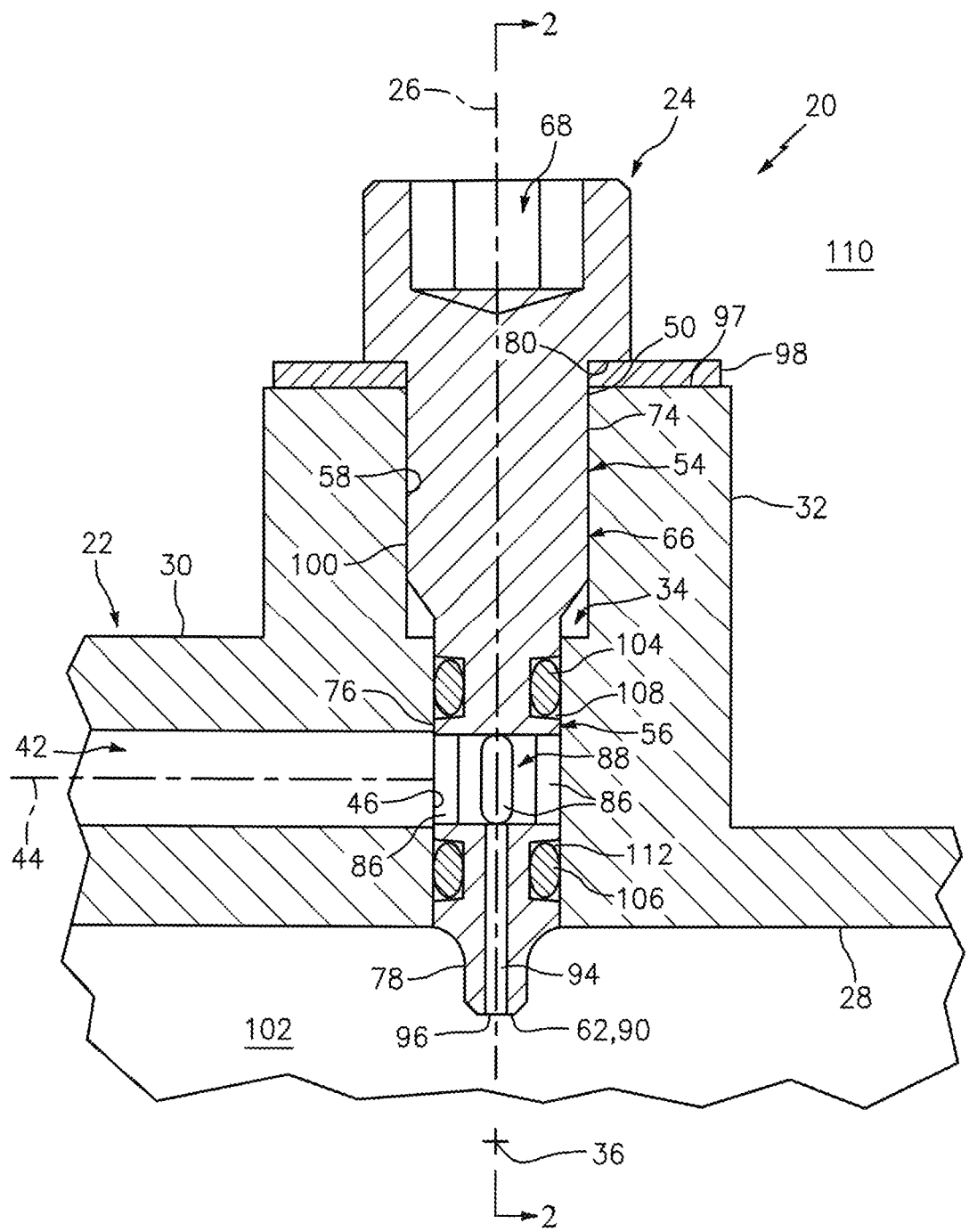
FIG. 1 is a sectional illustration of a portion of an assembly for an internal combustion engine.
Figure 2:
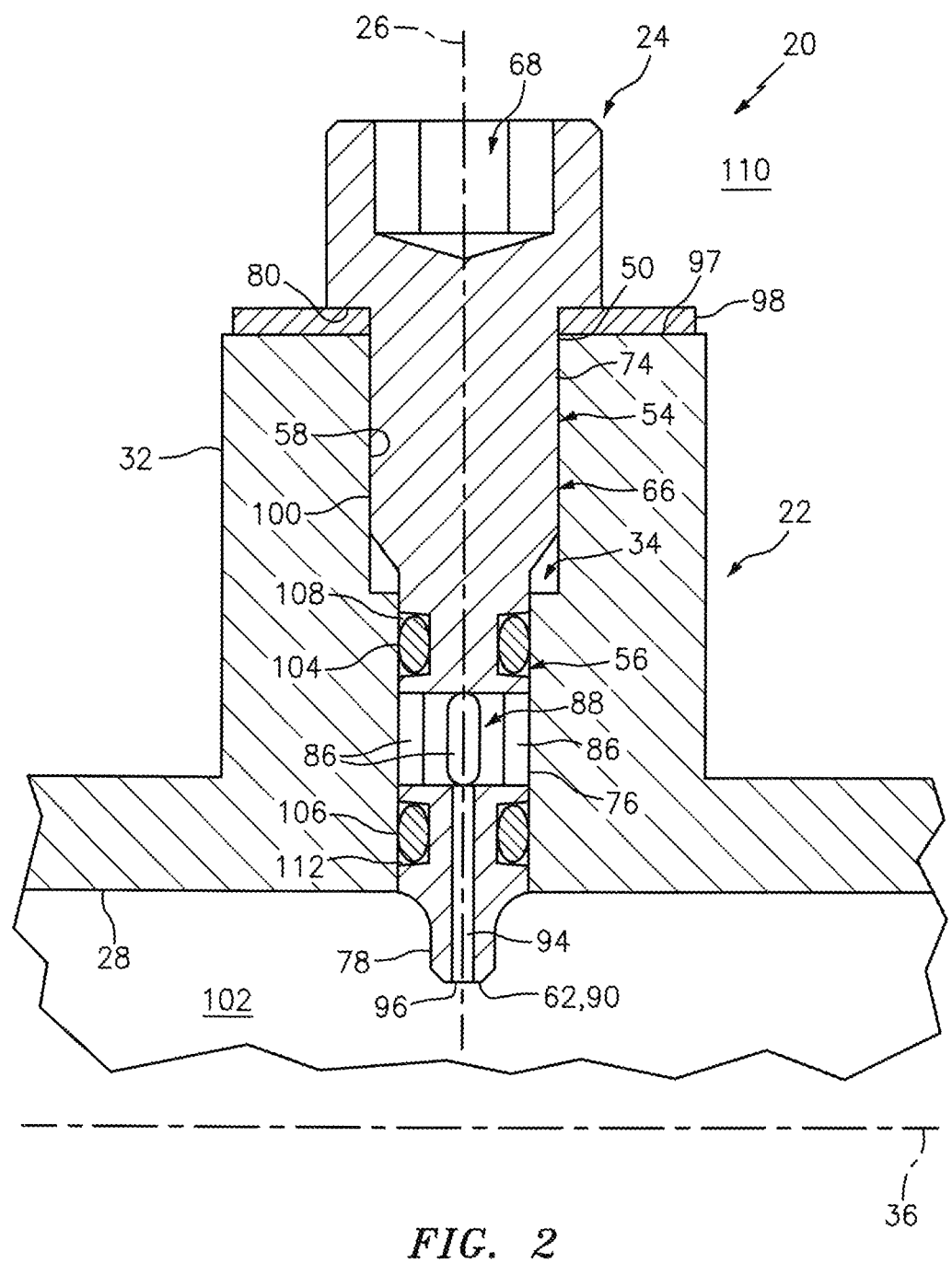
FIG. 2 is a sectional illustration of a portion of the engine assembly taken along line 2-2 in FIG. 1.

FIGS. 1 and 2 are sectional illustrations of an assembly 20 for an internal combustion (IC) engine. For ease of description, this engine may be described below as a gas turbine engine. The present disclosure, however, is not limited to gas turbine engine applications. For example, the engine may alternatively be configured as a reciprocating piston engine, a rotary engine, or any other type of engine where fuel is continuously or periodically injected into chamber or another internal volume (e.g., an open space) for combustion.

Figure 13:
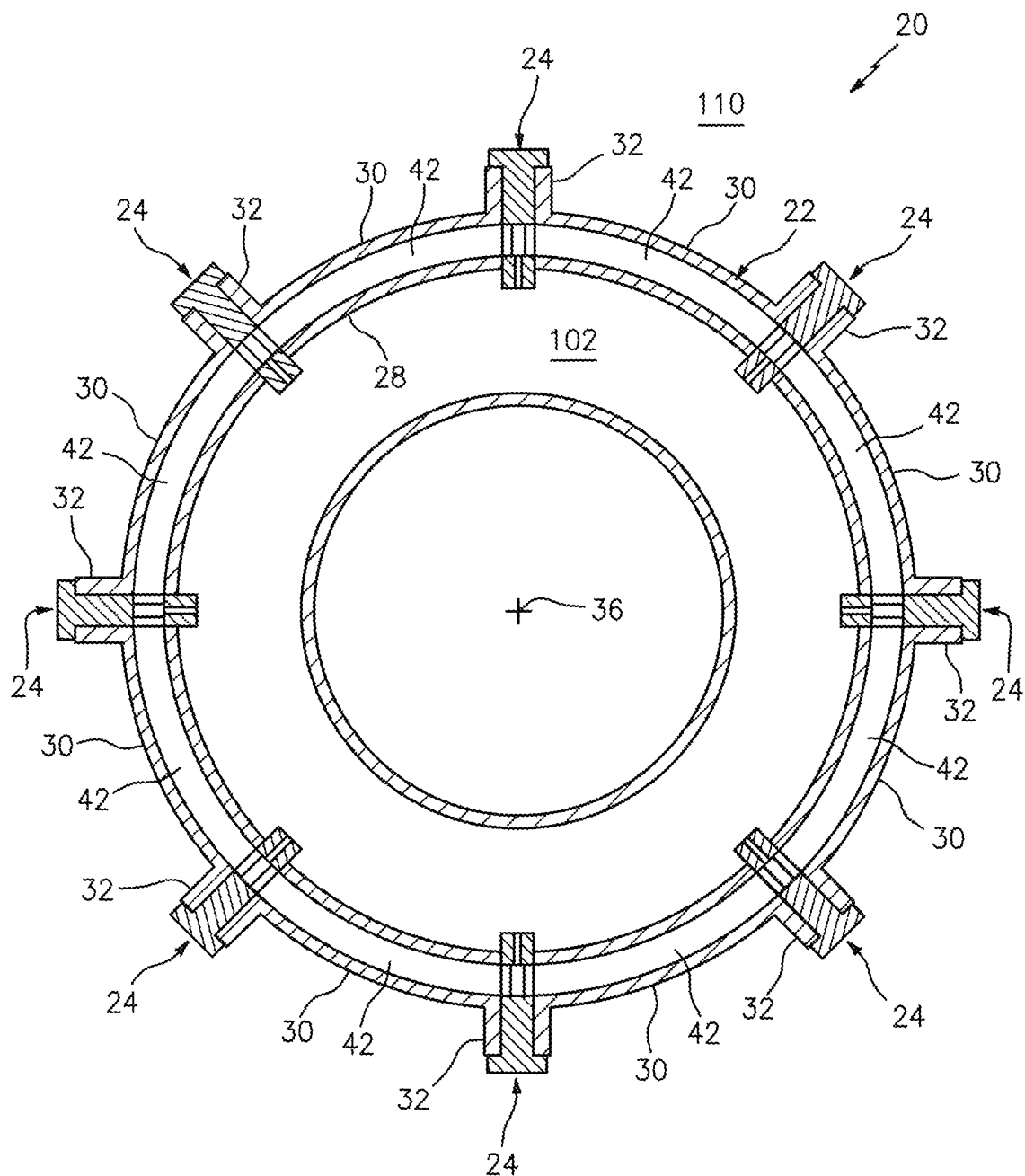
FIG. 13 is a cross-sectional illustration of the engine assembly configured with a plurality of the fuel injectors.

The engine assembly 20 includes a static engine structure 22; see also FIG. 13. The engine assembly 20 also includes a removable/modular fuel injector 24 with a longitudinal centerline 26; e.g., a straight centerline axis.

Figure 3:
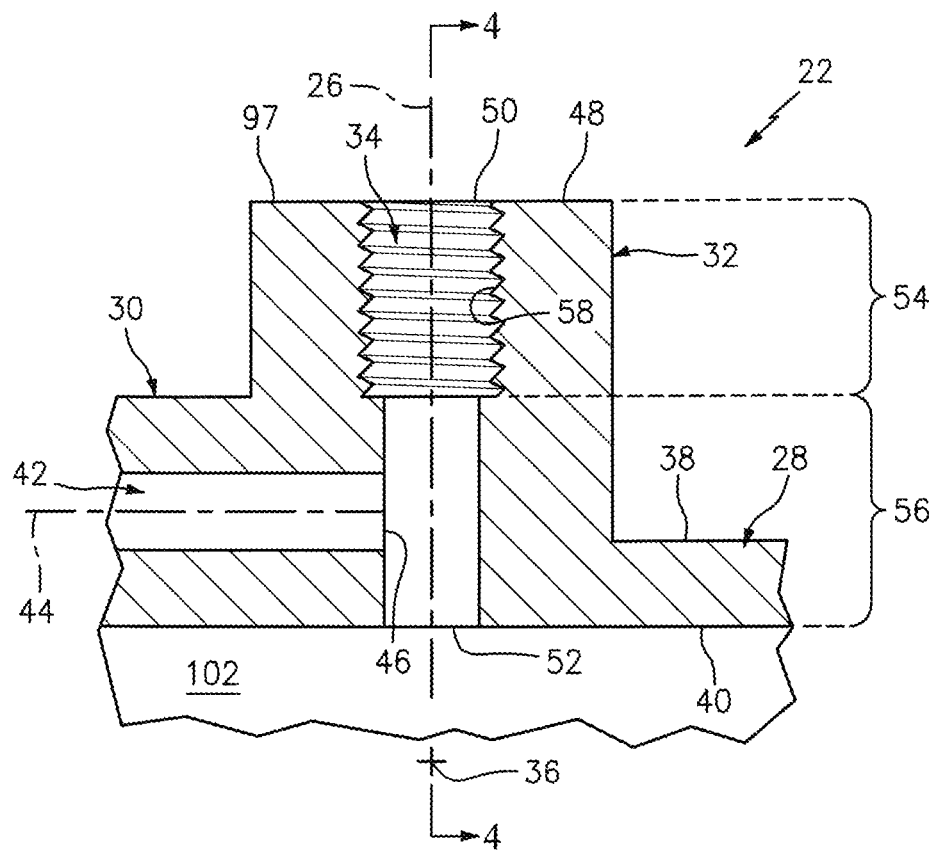
FIG. 3 is a sectional illustration of a portion of an engine structure for the engine assembly.
Figure 4:
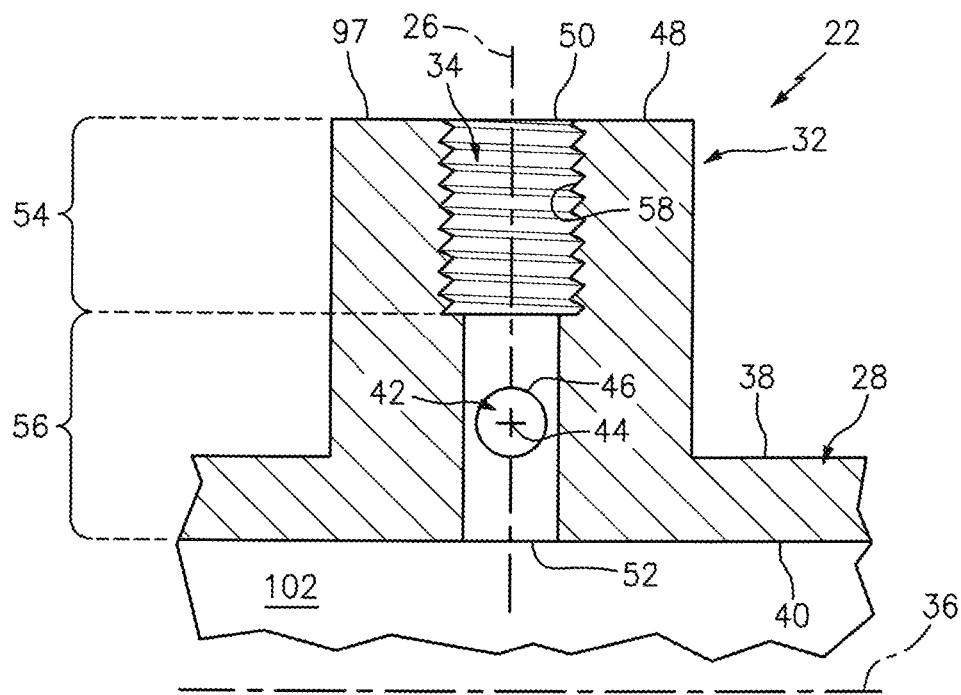
FIG. 4 is a section illustration of a portion of the engine structure taken along line 4-4 in FIG. 3.

Referring to FIGS. 3 and 4, the engine structure 22 may be configured as any stationary part of the engine that is proximate the fuel injector 24. The engine structure 22 of FIGS. 3 and 4, for example, may be configured as an engine casing such as, but not limited to, a combustor section case, a diffuser case and/or a combustor wall (e.g., a liner wall, a bulkhead wall, etc.). The engine structure 22 of FIGS. 3 and 4 includes a case wall 28, a fuel conduit 30, a fuel injector boss 32 and a fuel injector aperture 34.

The case wall 28 may be configured as an arcuate or tubular member. The case wall 28 of FIGS. 3 and 4, for example, extends axially along a centerline axis 36 of the engine structure 22, which engine structure centerline axis 36 may be coaxial with a centerline axis and/or a rotational axis of the engine. The case wall 28 extends circumferentially about (e.g., partially or completely around) the engine structure centerline axis 36. The case wall 28 extends radially between a first (e.g., exterior, outer) side 38 of the case wall 28 and a second (e.g., interior, inner) side 40 of the case wall 28, which case wall second side 40 is radially opposite the case wall first side 38.

The fuel conduit 30 of FIG. 3 is configured as, or may be part of, a fuel supply for the fuel injector 24. The fuel conduit 30, for example, may be or may be part of a fuel supply tube, a fuel inlet manifold and/or a fuel distribution manifold. The fuel conduit 30 is arranged at and/or is connected to the case wall first side 38. The fuel conduit 30 is configured with an internal fuel supply passage 42. This supply passage 42 may be formed by an internal bore and/or channel within the fuel conduit 30. The supply passage 42 extends within and/or through the fuel conduit 30 along a (e.g., curved and/or straight) centerline 44 of the supply passage 42 (laterally relative to the centerline 26; see FIG. 1) to a supply passage orifice 46, which supply passage centerline 44 may also be a centerline of the fuel conduit 30.

The injector boss 32 is configured for mounting the fuel injector 24 with the engine structure 22; see FIGS. 1 and 2. The injector boss 32 of FIGS. 3 and 4, for example, is a tubular member configured to receive the fuel injector 24. The injector boss 32 is arranged at and/or is connected to the case wall first side 38. The injector boss 32 of FIGS. 3 and 4, for example, projects longitudinally out from the case wall 28 and its first side 38 along the centerline 26 to a distal end 48 of the injector boss 32.

The injector aperture 34 may be formed by an internal bore and/or channel within the engine structure 22. The injector aperture 34 extends longitudinally along the centerline 26 through the engine structure 22 to and between a first (e.g., exterior, outer) end 50 of the injector aperture 34 and a second (e.g., interior, inner) end 52 of the injector aperture 34, which aperture second end 52 is longitudinally opposite the aperture first end 50. The aperture first end 50 is arranged at the injector boss distal end 48. The aperture second end 52 is arranged at the case wall second side 40. The injector aperture 34 of FIGS. 3 and 4 thereby extends longitudinally along the centerline 26 from the injector boss distal end 48, through the injector boss 32 and the case wall 28, to the case wall second side 40.

The injector aperture 34 may include a threaded portion 54 and a non-threaded portion 56. The aperture threaded portion 54 is a tapped portion of a sidewall 58 of the injector aperture 34. The aperture threaded portion 54 is disposed at (e.g., on, adjacent or proximate) the aperture first end 50. The aperture non-threaded portion 56 is an untapped (e.g., smooth, cylindrical) portion of the aperture sidewall 58. The aperture non-threaded portion 56 is disposed at the aperture second end 52.

The passage orifice 46 is disposed along an intermediate region of the injector aperture 34. The passage orifice 46, for example, is located longitudinally (e.g., midway) between the aperture first end 50 and the aperture second end 52 along the centerline 26. The passage orifice 46 of FIGS. 3 and 4, in particular, is disposed in the untapped portion of the aperture sidewall 58—in the aperture non-threaded portion 56. The supply passage 42 is thereby fluidly coupled with the injector aperture 34 and its non-threaded portion 56.

Figure 5:
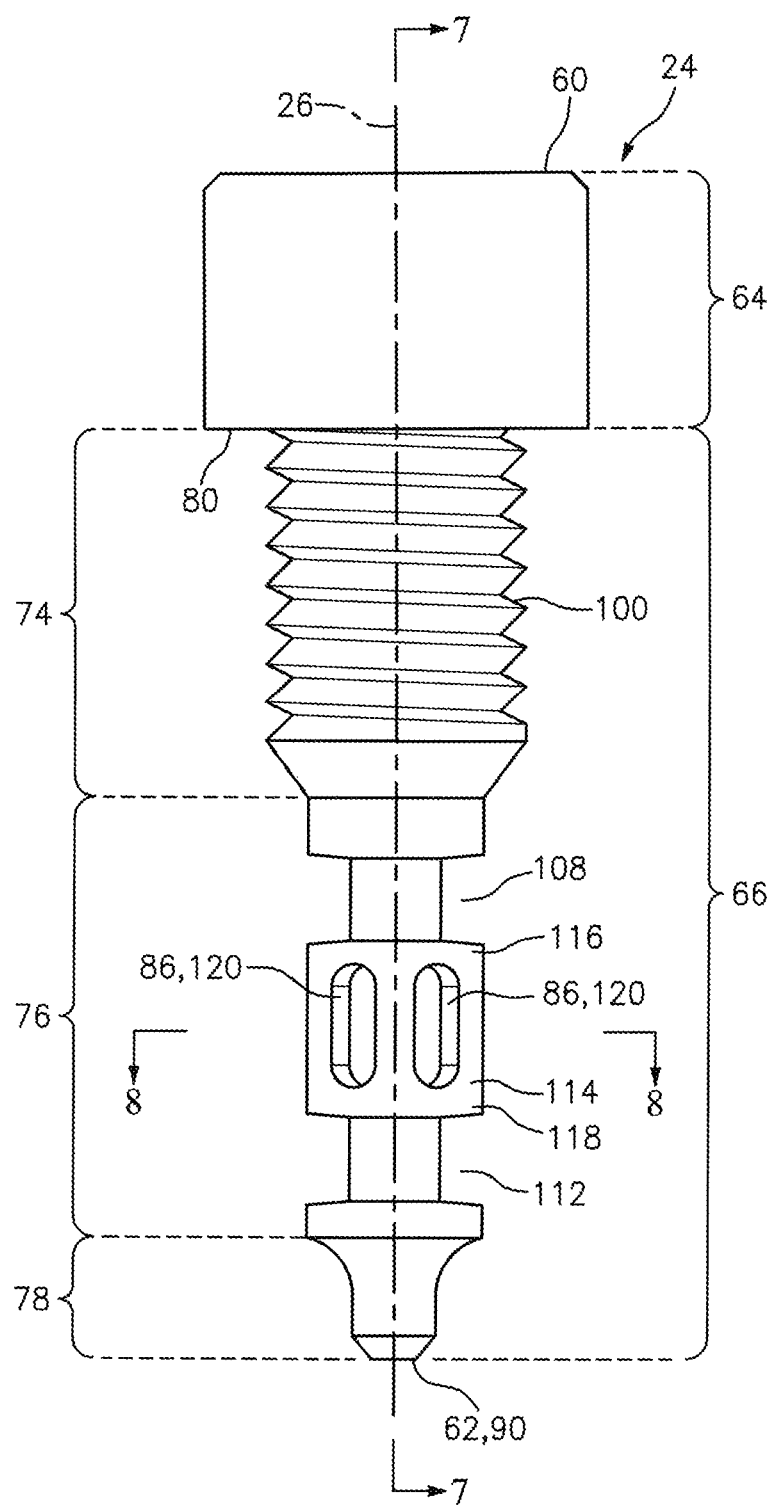
FIG. 5 is an illustration of a fuel injector.

Referring to FIG. 5, the fuel injector 24 may be configured as a fuel injector bolt or plug. The fuel injector 24 of FIG. 5, in particular, extends longitudinally along the centerline 26 between and to a first (e.g., exterior, outer) end 60 of the fuel injector 24 and a second (e.g., interior, inner) end 62 of the fuel injector 24, which injector second end 62 is longitudinally opposite the injector first end 60. The fuel injector 24 of FIG. 5 includes a fuel injector head 64 and a fuel injector base 66, where the injector head 64 may be a head of the fuel injector bolt/plug and the injector base 66 may be a shank of the fuel injector bolt/plug.

Figures 6A, 6B:
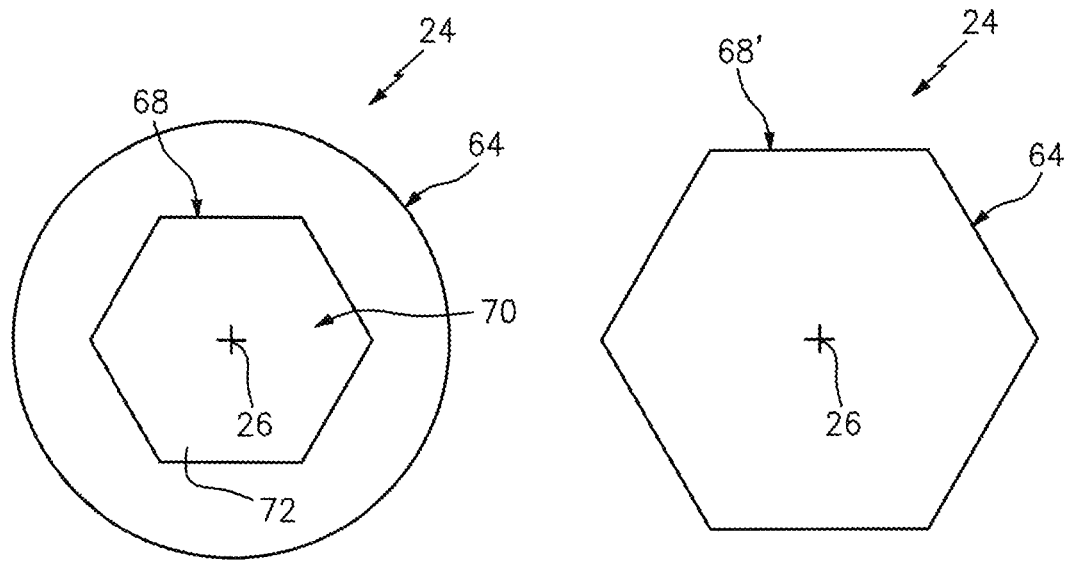
FIG. 6A is an illustration of a head of the fuel injector with an internal wrenching feature.
FIG. 6B is an illustration of the fuel injector head with an external wrenching feature.

The injector head 64 is connected to the injector base 66 and arranged at the injector first end 60. Referring to FIGS. 6A and 6B, the injector head 64 may be configured with a wrenching feature 68, 68'. The injector head 64 of FIGS. 6A and 7, for example, is configured with a recess 70 for receiving and mating with a tool (not shown) such as, but not limited to, a hex-head tool (e.g., an Allen wrench or drive). The recess 70 projects longitudinally along the centerline 26 partially into the injector head 64 from the injector first end 60 to an end 72 of the wrenching feature 68. The recess 70 of FIG. 6A has a polygonal cross-sectional geometry such as, but not limited to, a hexagonal cross-sectional geometry when viewed, for example, in a plane perpendicular to the centerline 26; e.g., plane of FIG. 6A. While the wrenching feature 68 is described above as an internal wrenching feature, the injector head 64 may also or alternatively be configured with an external wrenching feature 68'. For example, referring to FIG. 6B, an exterior of the injector head 64 may be configured one or more flats (e.g., planer surfaces) to provide the head 64 with a polygonal cross-sectional geometry.

Referring to FIG. 5, the injector base 66 projects longitudinally along the centerline 26 from the injector head 64 to the injector second end 62. The injector base 66 of FIG. 5 includes a (e.g., threaded) fuel injector mount 74, a fuel coupler 76 and a fuel nozzle 78.

The injector mount 74 is longitudinally between and connected to the injector head 64 and the fuel coupler 76. The injector mount 74 of FIG. 5, for example, extends longitudinally along the centerline 26 to and between the injector head 64 and the fuel coupler 76. The injector mount 74 may be a solid portion of the fuel injector 24; see also FIG. 7. The injector mount 74, for example, may be configured without any pathways through which fluid (e.g., fuel) may to travel (e.g., laterally and/or longitudinally) thereacross. More particularly, the fuel injector 24 of FIG. 5 is configured without any apertures, bores, channels, etc. extending laterally and/or longitudinally through the injector mount 74.

An exterior of the injector mount 74 is configured with threads 100 for mating with the aperture threaded portion 54; see FIGS. 1 and 2. The threaded exterior of the injector mount 74 may be laterally (e.g., radially relative to the centerline 26) recessed from the exterior of the injector head 64 such that a (e.g., annular) head shoulder 80 extends laterally between the exteriors and circumferentially around the centerline 26.

Figure 7:
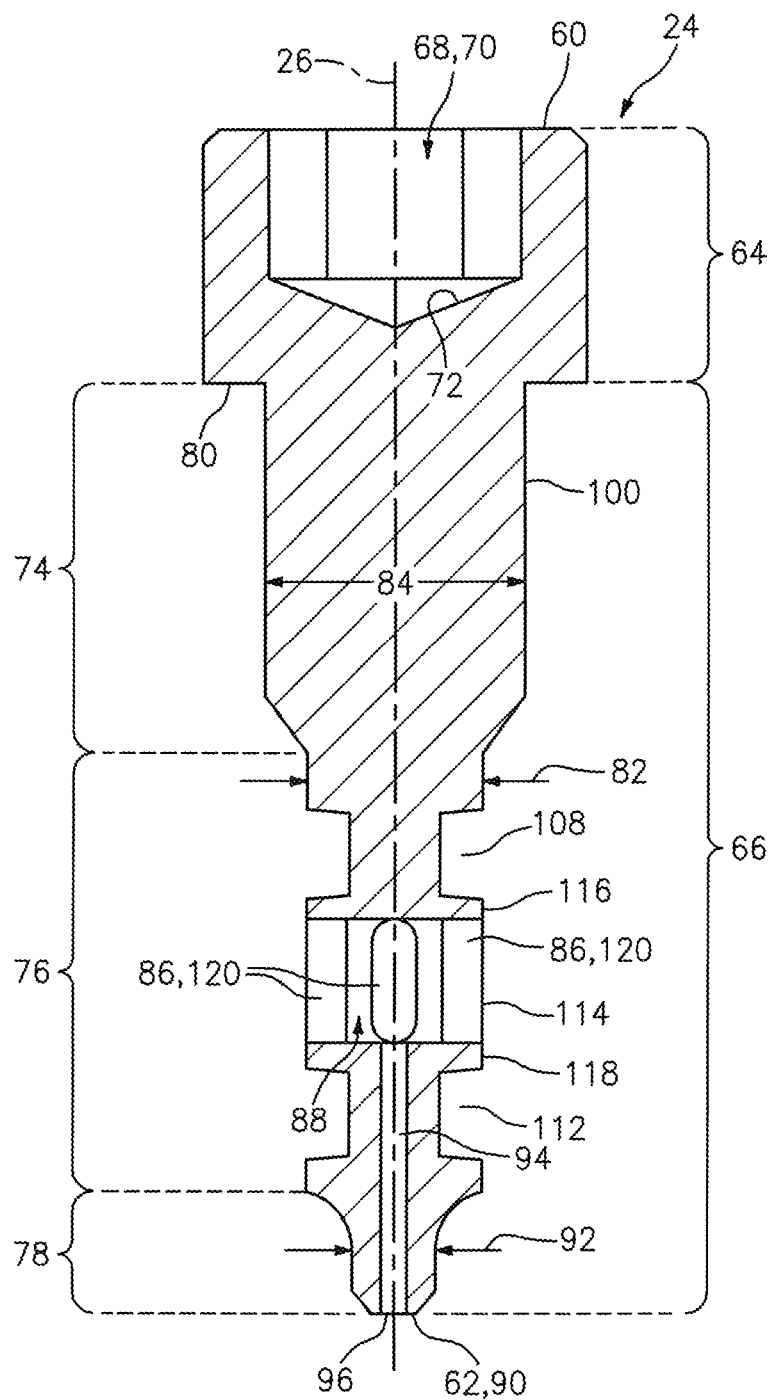
FIG. 7 is a sectional illustration of the fuel injector taken along line 7-7 in FIG. 5.

Referring to FIG. 7, the fuel coupler 76 is longitudinally between and connected to the injector mount 74 and the fuel nozzle 78. The fuel coupler 76 of FIG. 7, for example, extends longitudinally along the centerline 26 to and between the injector mount 74 and the fuel nozzle 78. The fuel coupler 76 is configured with a lateral width 82 (e.g., a diameter) that is less than a lateral width 84 (e.g., a diameter) of the injector mount 74.

Figure 8:
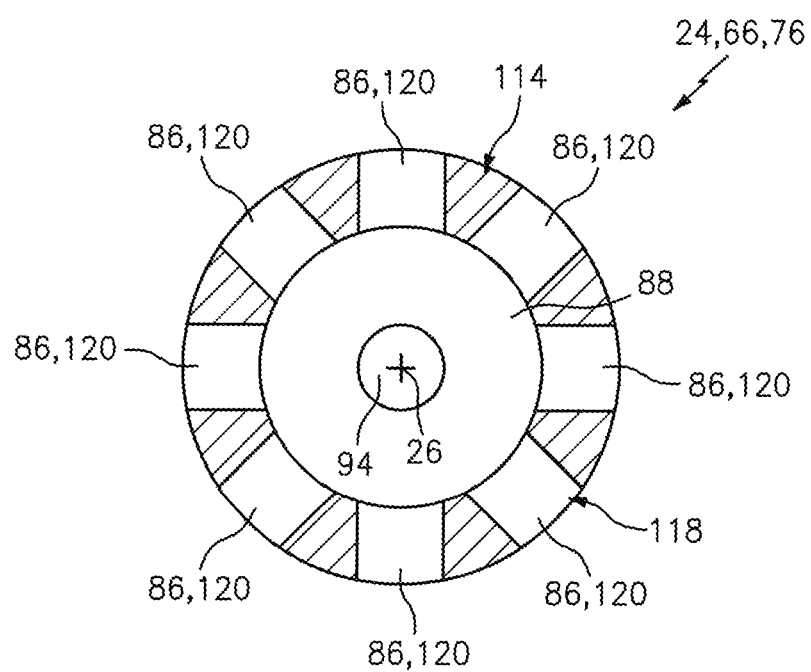
FIG. 8 is a cross-sectional illustration of the fuel injector taken along line 8-8 in FIG. 5.

The fuel coupler 76 includes one or more ports 86 (e.g., apertures, windows, pass-throughs, etc.) and an internal volume 88 (e.g., a plenum, a chamber, etc.). Referring to FIG. 8, the ports 86 are arranged circumferentially about the centerline 26. Each port 86 provides a flowpath from an exterior of the fuel coupler 76 into the internal volume 88. Each port 86 of FIG. 8, for example, projects laterally (e.g., radially relative to the centerline 26) into the fuel coupler 76 from the exterior of the fuel coupler 76 to the internal volume 88. The internal volume 88 is laterally and longitudinally within the fuel coupler 76. The internal volume 88, for example, may be an internal bore within the fuel coupler 76.

Referring to FIG. 7, the fuel nozzle 78 is connected to the fuel coupler 76. The fuel nozzle 78 of FIG. 7, for example, projects longitudinally along the centerline 26 from the fuel coupler 76 to a distal end 90 (e.g., a tip) of the fuel nozzle 78 at the injector second end 62. The fuel nozzle 78 is configured with a lateral width 92 (e.g., a diameter) that is different (e.g., less) than the coupler lateral width 82 at the distal end 90; however, the present disclosure is not limited thereto.

The fuel nozzle 78 is configured with a nozzle passage 94 (e.g., a fuel passage) and a nozzle orifice 96. An internal bore of the fuel injector 24 at least partially (or completely) forms the nozzle passage 94. The nozzle passage 94 and its internal bore extend longitudinally along the centerline 26 from the internal volume 88 within the fuel coupler 76 to the nozzle orifice 96 at the injector second end 62; e.g., a distal end/tip of the fuel nozzle 78. The nozzle passage 94 may thereby extend longitudinally along the centerline 26 out of the fuel coupler 76 and then through the fuel nozzle 78 to the nozzle orifice 96. The nozzle orifice 96 provides an outlet from the nozzle passage 94 and, more generally, the fuel injector 24 and its nozzle 78.

Referring to FIGS. 1 and 2, the fuel injector 24 is mated with (e.g., disposed and/or threaded into) the injector aperture 34. For example, during assembly, the fuel nozzle 78 is inserted longitudinally into the injector aperture 34 at the aperture first end 50. The fuel nozzle 78 is moved longitudinally through the aperture threaded portion 54 and into the aperture non-threaded portion 56. The external threads of the injector mount 74 are mated with the internal threads of the aperture threaded portion 54. The fuel injector 24 is threaded (e.g., screwed) into the injector aperture 34 using a tool (not shown) until, for example, the head shoulder 80 is longitudinally abutted and preloaded indirectly against a surface 97 at the boss distal end 60 through, for example, a washer 98, or directly against the boss distal end surface 97 where, for example, the washer 98 is omitted. The fuel injector 24 is thereby removably attached to the engine structure 22 by a threaded interface between the interior threads on the sidewall 58 of the aperture threaded portion 54 and the exterior threads on the injector mount 74.

In the assembled position of FIG. 1, the passage orifice 46 is aligned with the fuel coupler 76 and at least one of its ports 86. One of the ports 86, for example, may at least partially (or completely) longitudinally overlap and may at least partially (or completely) circumferentially overlap the passage orifice 46 to provide a (e.g., unobstructed, or only partially obstructed) fluid coupling between the supply passage 42 and the internal volume 88. Note, the ports 86 may be configured with the fuel coupling (e.g., sized and spaced around the centerline 26) such that, for example, at least one of these ports 86 is at least partially (or completely) aligned with the passage orifice 46 no matter how the fuel nozzle 78 is clocked about the centerline 26 within the injector aperture 34.

The injector mount 74 and/or the fuel coupler 76 may be arranged completely within the injector aperture 34. The fuel nozzle 78 may be arranged (e.g., partially or completely) within and/or outside of the injector aperture 34. More particularly, the fuel nozzle 78 of FIGS. 1 and 2 projects longitudinally out from the injector aperture 34, away from the case wall second side 40 and into a plenum 102 (e.g., an air passage) within the engine structure 22.

With the above configuration, the fuel injector 24 may be installed with the engine structure 22 and removed from the engine structure 22 from an exterior of the engine structure 22. Assembly personnel, maintenance personnel and/or inspection personnel may thereby install, replace and/or service the fuel injector 24 without requiring disassembly and/or removal of the engine structure 22 nor access to an interior of the engine structure 22. Fuel injectors 24 with, for example, different fuel coupler 76 configurations, fuel nozzle 78 configurations, etc. may be more easily swapped. The plug-and-play operation of the fuel nozzle 78 reduces complexity of the fuel delivery system. For example, a single step of mating the fuel injector 24 with the engine structure 22 may (A) fluidly couple the fuel injector 24 with the fuel conduit 30 as well as (B) position the fuel nozzle 78 for operation. Furthermore, the bolt-like design of the fuel injector 24 may simplify the mechanical connection between the fuel injector 24 and the engine structure 22.

Referring to FIG. 1, during engine operation, (e.g., liquid) fuel is directed into the supply passage 42 from a fuel source (not shown) such as, but not limited to, a fuel reservoir (e.g., a tank). At least a portion (or all) of the fuel within the supply passage 42 is directed through a respective one of the ports 86 and into the internal volume 88. At least a portion (or all) of the fuel within the internal volume 88 is directed into the nozzle passage 94. This fuel flows through the nozzle passage 94 and out of the fuel nozzle 78 through the nozzle orifice 96 and into the plenum 102 (e.g., the air passage) within the engine structure 22. The fuel within the plenum 102 may be mixed with air (e.g., compressed air) for subsequent combustion in, for example, another downstream volume (e.g., a combustion chamber) within the engine or alternatively within the plenum 102 where, for example, the plenum 102 is a combustion chamber.

In some embodiments, referring to FIG. 1, the fuel injector 24 may be configured with one or more annular seal elements 104 and 106. Each seal element 104, 106 may be configured as a ring seal such as, but not limited to, an O-ring element, a C-seal element, a crush seal element, a washer, etc. The ports 86 and the passage orifice 46 of FIG. 1 are positioned longitudinally along the centerline 26 between the first (e.g., outer) seal element 104 and the second (e.g., inner) seal element 106.

The first seal element 104 is seated in an annular first (e.g., outer) seal receptacle 108 (e.g., a notch, a groove, a channel, etc.) in the injector base 66; see also FIGS. 5 and 7. The first seal receptacle 108 of FIG. 1, in particular, is located in an outer portion of the fuel coupler 76. However, in other embodiments, the first seal receptacle 108 may be located in an inner portion of the injector mount 74, or in another portion of the fuel injector 24 and its base 66 longitudinally between the fuel coupler 76 and the injector mount 74.

The first seal element 104 is laterally engaged with the injector base 66 and the aperture sidewall 58 in the aperture non-threaded portion 56. The first seal element 104 may thereby form a seal interface between the fuel injector 24 and the engine structure 22 such that the fuel, for example, does not leak (e.g., in an outward direction; vertically up in FIG. 1) between the engine assembly elements 24 and 32 into an external plenum 110.

The second seal element 106 is seated in an annular second (e.g., inner) seal receptacle 112 (e.g., a notch, a groove, a channel, etc.) in the injector base 66; see also FIGS. 5 and 7. The second seal receptacle 112 of FIG. 1, in particular, is located in an inner portion of the fuel coupler 76. However, in other embodiments, the second seal receptacle 112 may be located in an outer portion of the fuel nozzle 78, or in another portion of the fuel injector 24 and its base 66 longitudinally between the fuel coupler 76 and the fuel nozzle 78.

The second seal element 106 is laterally engaged with the injector base 66 and the aperture sidewall 58 in the aperture non-threaded portion 56. The second seal element 106 may thereby form a seal interface between the fuel injector 24 and the engine structure 22 such that the fuel, for example, does not leak (e.g., in an inward direction; vertically down in FIG. 1) between the engine assembly elements 24 and 28 into the internal plenum 102.

In some embodiments, referring to FIGS. 5, 7 and 8, the fuel coupler 76 may include a tubular sidewall 114. The fuel coupler 76 may also include one or more end walls 116 and 118. The tubular sidewall 114 of FIGS. 5 and 7 is connected to and extends longitudinally along the centerline 26 to and between the first (e.g., outer) end wall 116 and the second (e.g., inner) end wall 118. Referring to FIG. 8, the tubular sidewall 114 extends circumferentially around the centerline 26 and the internal volume 88. The tubular sidewall 114 includes one or more apertures 120; e.g., through-holes, slots, etc. Each of these apertures 120 extends laterally (e.g., radially relative to the centerline 26) through the tubular sidewall 114. Each of the apertures 120 extends longitudinally along the centerline 26 between and to the fuel coupler end walls 116 and 118. Each of the apertures 120 may thereby be/form a respective one of the ports 86 in the fuel coupler 76. The internal volume 88 may be laterally bounded by the tubular sidewall 114, and longitudinally bounded between the first end wall 116 and the second end wall 118 along the centerline 26.

In some embodiments, referring to FIGS. 9-12, the fuel coupler 76 may include one or more struts 122; e.g., spars, vanes, foils, posts, etc. The fuel coupler 76 may also include the one or more end walls 116 and 118. The struts 122 of FIGS. 9-12 are arranged circumferentially about the centerline 26 and the internal volume 88. Each of the struts 122 is connected to and extends longitudinally along the centerline 26 between and to the first end wall 116 and the second end wall 118. Each of the struts 122 is circumferentially spaced from its circumferentially neighboring struts 122. The space between each circumferentially adjacent pair of the struts 122 may be/form a respective one of the ports 86. More particularly, each port 86 extends circumferentially between and to a respective circumferentially adjacent pair of the struts 122. Each port 86 extends longitudinally along the centerline 26 between and to the fuel coupler end walls 116 and 118. The internal volume 88 may be laterally bounded by the struts 122, and longitudinally bounded between the first end wall 116 and the second end wall 118 along the centerline 26.

Figure 9:
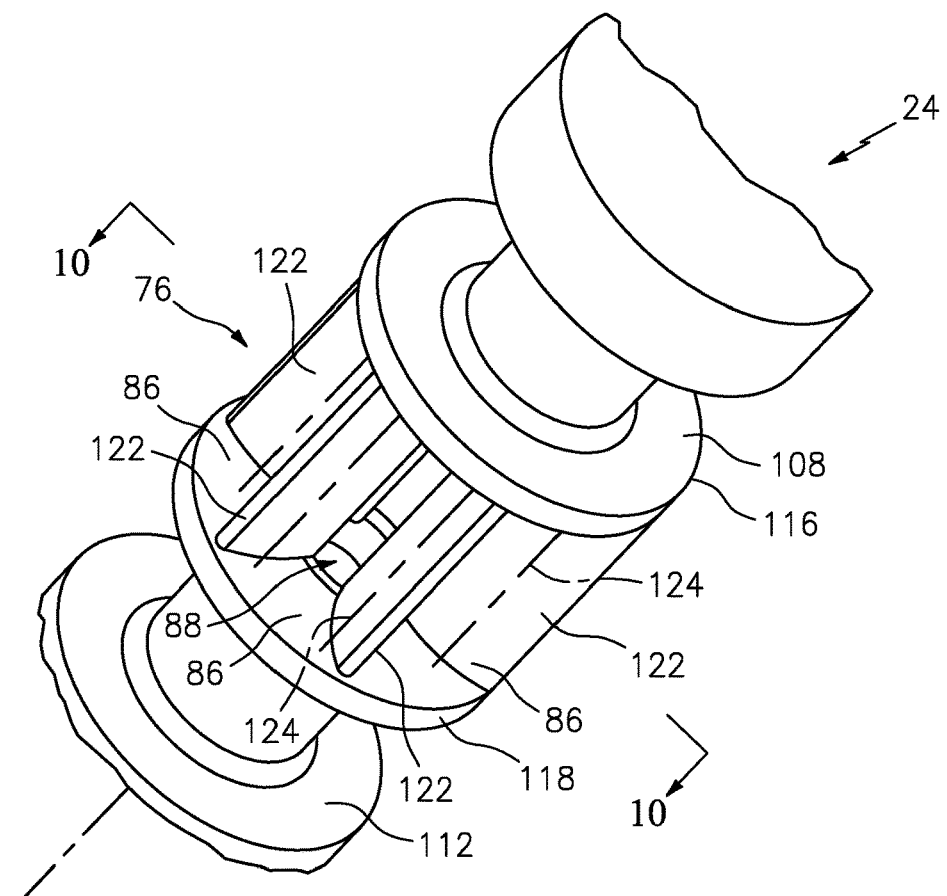
FIG. 9 is a perspective illustration of a portion of the fuel injector configured with a set of straight struts.
Figure 10:
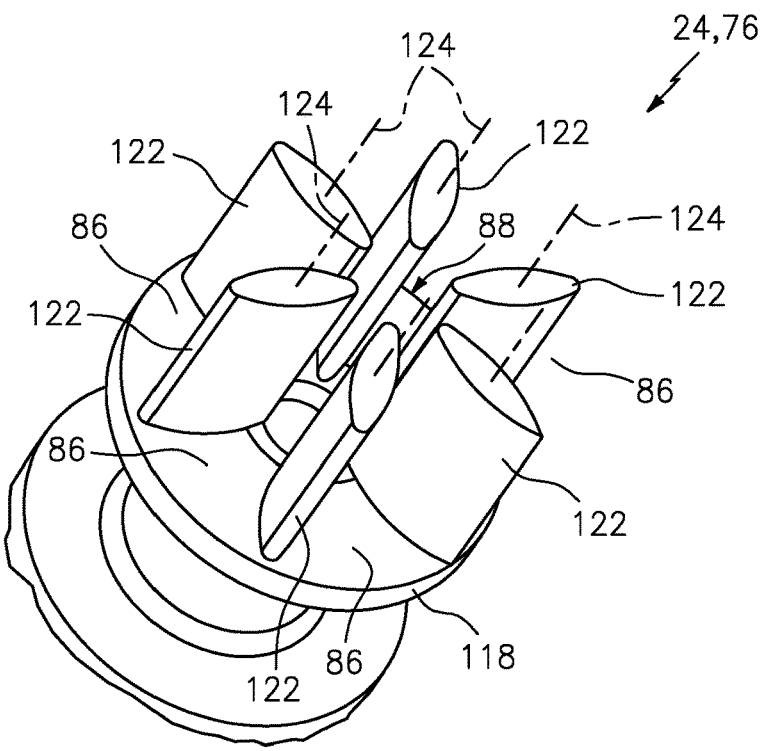
FIG. 10 is a perspective cross-sectional illustration of a portion of the fuel injector taken along line 10-10 in FIG. 9.
Figure 11:
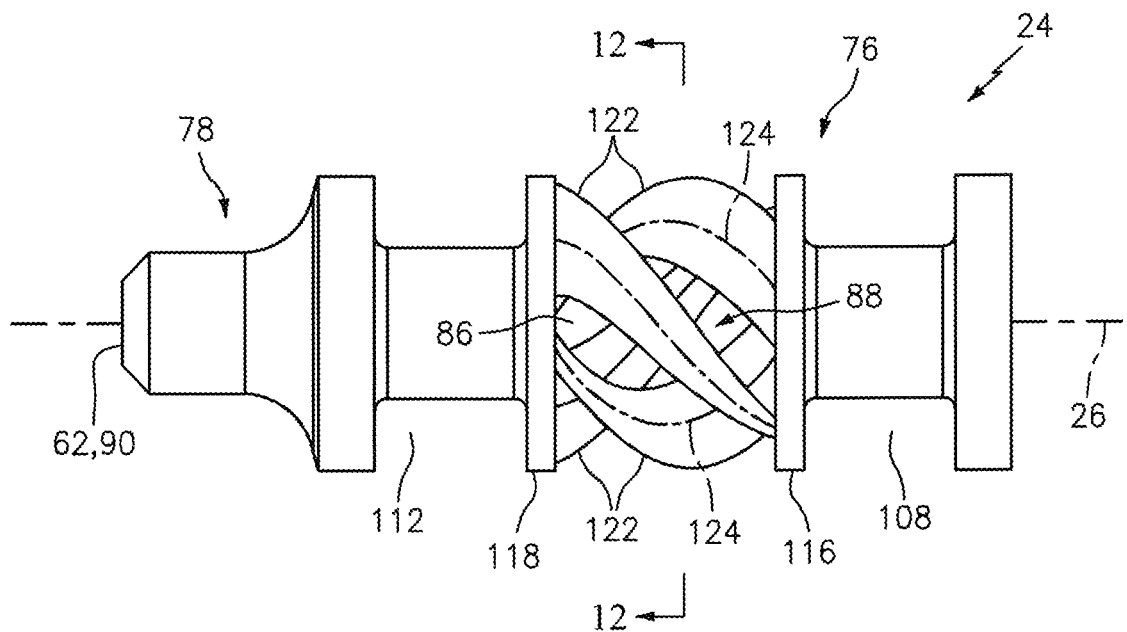
FIG. 11 is an illustration of a portion of the fuel injector configured with a set of non-straight struts.
Figure 12:
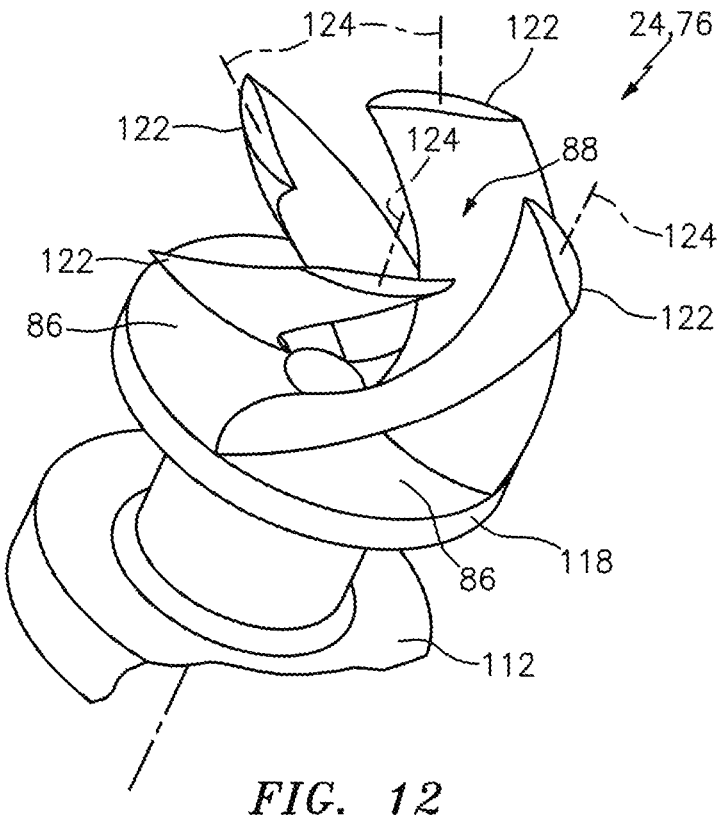
FIG. 12 is a perspective cross-sectional illustration of a portion of the fuel injector taken along line 12-12 in FIG. 11.

Each of the struts 122 have a respective strut centerline 124. Each of the struts 122 extends along its strut centerline 124 between and to the fuel coupler end walls 116 and 118. Referring to FIGS. 9 and 10, at least a portion or an entirety of one or more or all of the strut centerlines 124 may each follow a straight trajectory. Alternatively, referring to FIGS. 11 and 12, at least a portion or the entirety of one or more or all of the strut centerlines 124 may each follow a non-straight trajectory. Examples of the non-straight trajectory include, but are not limited to, a curved trajectory, a spline trajectory, a spiral trajectory and a helical trajectory.

Each of the struts 122 has a cross-sectional geometry when viewed, for example, in a plane perpendicular to the centerline 26 and/or its respective strut centerline 124. This cross-sectional geometry may be an elongated cross-sectional geometry as shown, for example, in FIGS. 10 and 12. The cross-sectional geometry, for example, may have a double-tapered shape, an airfoil shape, an oval shape or a diamond shape. The present disclosure, however, is not limited to the foregoing exemplary elongated shapes nor to struts 122 with elongated cross-sectional geometries. For example, in other embodiments, the cross-sectional shape may be circular shaped or square shaped.

Providing the struts 122 of FIGS. 9-12 may increase circumferential widths of the ports 86. Increasing the port circumferential widths may further reduce a chance of one or more portions of the fuel coupler 76 (e.g., one or more of the struts 122) partially blocking (e.g., circumferentially overlapping) the supply orifice 46. In addition, the struts 122 (e.g., see FIGS. 11 and 12) may be configured to at least partially turn the fuel flowing laterally out of the supply passage 42 and its supply orifice 46 longitudinally along the centerline 26 into the nozzle passage 94. The struts 122 may thereby reduce fuel drag through the interface between the fuel conduit 30 and the fuel injector 24.

In some embodiments, referring to FIG. 13, the engine assembly 20 may include a plurality of the fuel injectors 24. These fuel injectors 24 may be arranged circumferentially about the engine structure centerline axis 36 in, for example, an annular array. Each of the fuel injectors 24 may be configured as described above. The engine structure 22 may also be generally configured as described above. However, the engine structure 22 may include a plurality of the fuel conduits 30 and a plurality of the injector bosses 32, where each injector boss 32 is configured to mount a respective one of the fuel injectors 24 with the engine structure 22.

Figure 14:
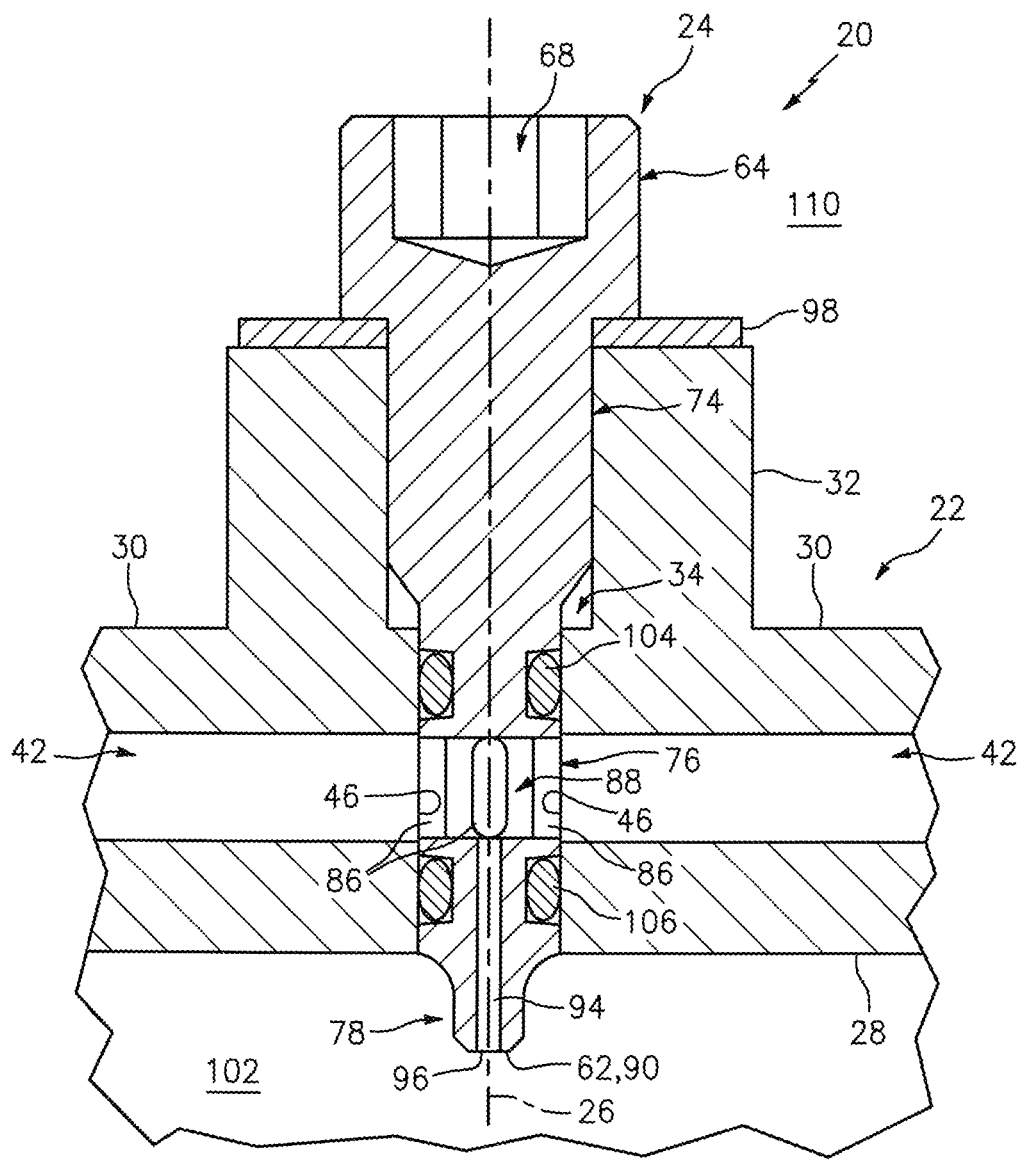
FIG. 14 is a sectional illustration of a portion of the engine assembly of FIG. 13.

The fuel conduits 30 may be configured to collectively form a fuel supply (e.g., a manifold) for the fuel injectors 24. Each fuel conduit 30 of FIG. 13, for example, is arranged between a respective circumferentially adjacent pair of the fuel injectors 24. Referring to FIG. 14, each injector boss 32 may be arranged circumferentially between and connected to respective circumferentially adjacent pair of the fuel conduits 30. Thus, each injector aperture 34 and the respective fuel injector 24 received therein is fluidly coupled with a respective pair of the supply passages 42.

In some embodiments, each fuel injector 24 may be configured as a monolithic body. Each fuel injector 24 and its elements 64, 74, 76 and 78, for example, may be additively manufactured, cast, machined and/or otherwise forms as a single integral, unitary body. The engine structure 22 may also or alternatively be configured as a monolithic body. The engine structure 22 and each of its elements 28, 30 and 32, for example, may be additively manufactured, cast, machined and/or otherwise formed as a single integral, unitary body. By contrast, a non-monolithic body may include parts that are discretely formed from one another, where those parts are subsequently mechanically fastened and/or otherwise attached to one another.

Figure 15:
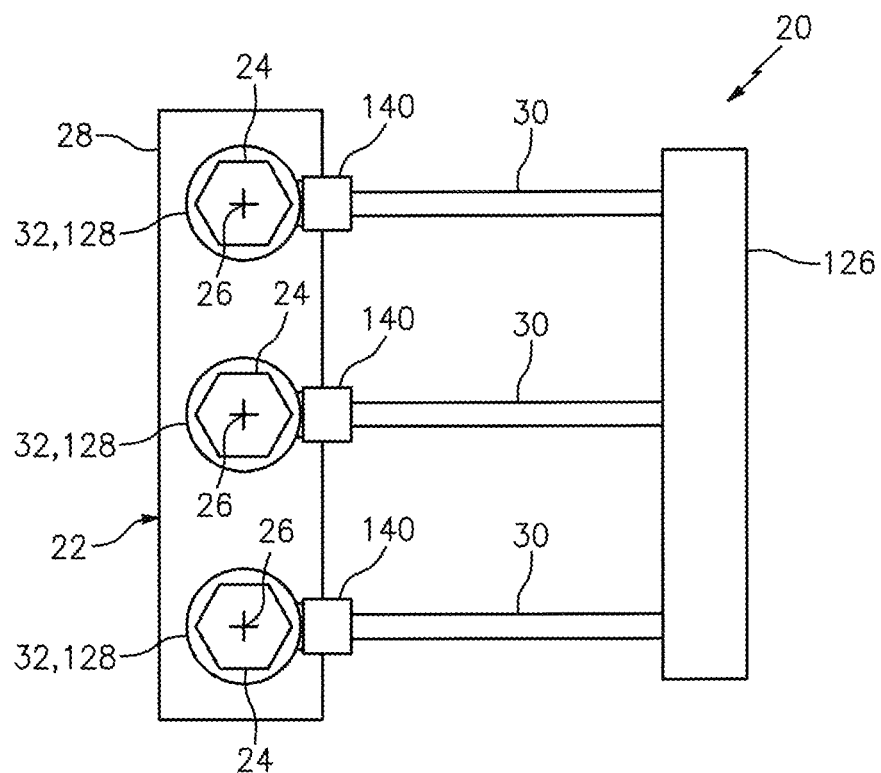
FIG. 15 is a schematic illustration of another engine assembly configured with a plurality of the fuel injectors.
Figure 16:
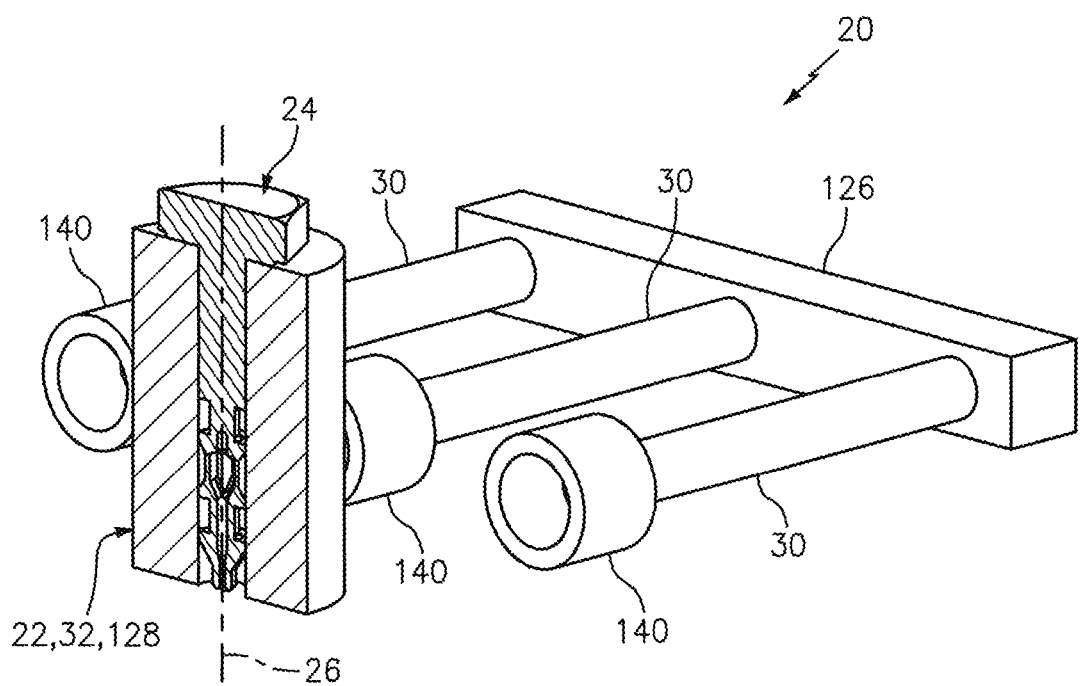
FIG. 16 is a perspective, cutaway illustration of a portion of the engine assembly of FIG. 15.

In some embodiments, referring to FIGS. 15 and 16, the fuel conduits 30 may be formed discrete from the engine structure 22. Each of the fuel conduits 30, for example, may be configured as a discrete line (e.g., pipe, hose, etc.) that fluidly couples and extends between a manifold 126 and a respective one of the injector bosses 32.

Figure 17:
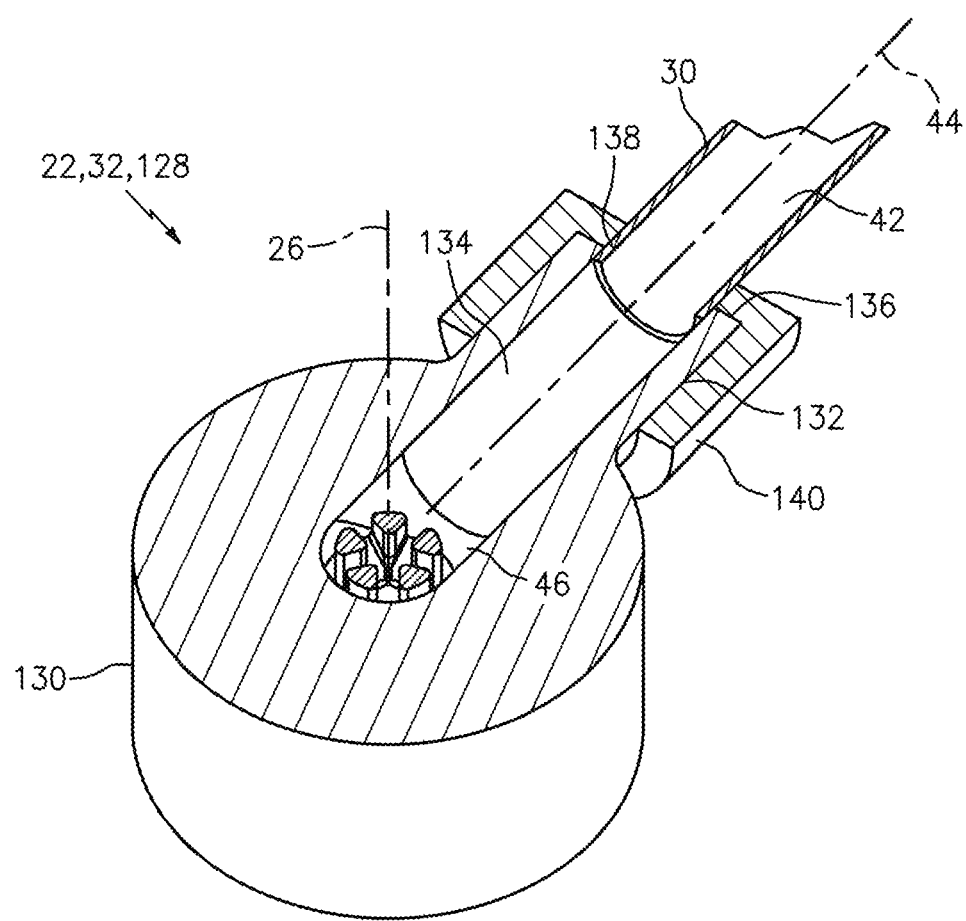
FIG. 17 is a perspective, sectional illustration of another portion of the engine assembly of FIG. 15.

Referring to FIG. 17, each injector boss 32 may be configured as a fuel injector fuel supply apparatus 128; e.g., a fitting, a mount, a coupler, etc. Each injector boss 32, for example, may include a boss base 130 (e.g., a tubular fitting base), a boss coupler 132 (e.g., a fitting coupler) and a supply passage 134. The boss coupler 132 projects laterally (e.g., radially relative to the centerline 26) out from an exterior of the boss base 130 to a distal end 136 of the boss coupler 132. The supply passage 134 extends laterally through the injector boss 32 (the fuel supply apparatus 128) from an inlet passage orifice 138 to the outlet passage orifice 46, where the inlet passage orifice 138 is located at the boss coupler distal end 136. The boss coupler 132 may thereby be configured as a male fitting such as, but not limited to, a nipple.

Each fuel conduit 30 may include a conduit coupler 140. The conduit coupler 140 of FIG. 17 includes a counterbore (or a bore) configured to receive the boss coupler 132. This conduit coupler 140 may thereby be configured as a female fitting such as, but not limited to, a receptacle. The conduit coupler 140 is configured to mate with the boss coupler 132. More particularly, the boss coupler 132 of FIG. 17 projects into the conduit coupler 140 to provide a fluid coupling between the elements 30 and 32 and the supply passages 42 and 134. The couplers 132 and 140 may be attached together via a threaded interface between the couplers; however, various other attachment techniques may also or alternatively be utilized.

Figure 18:
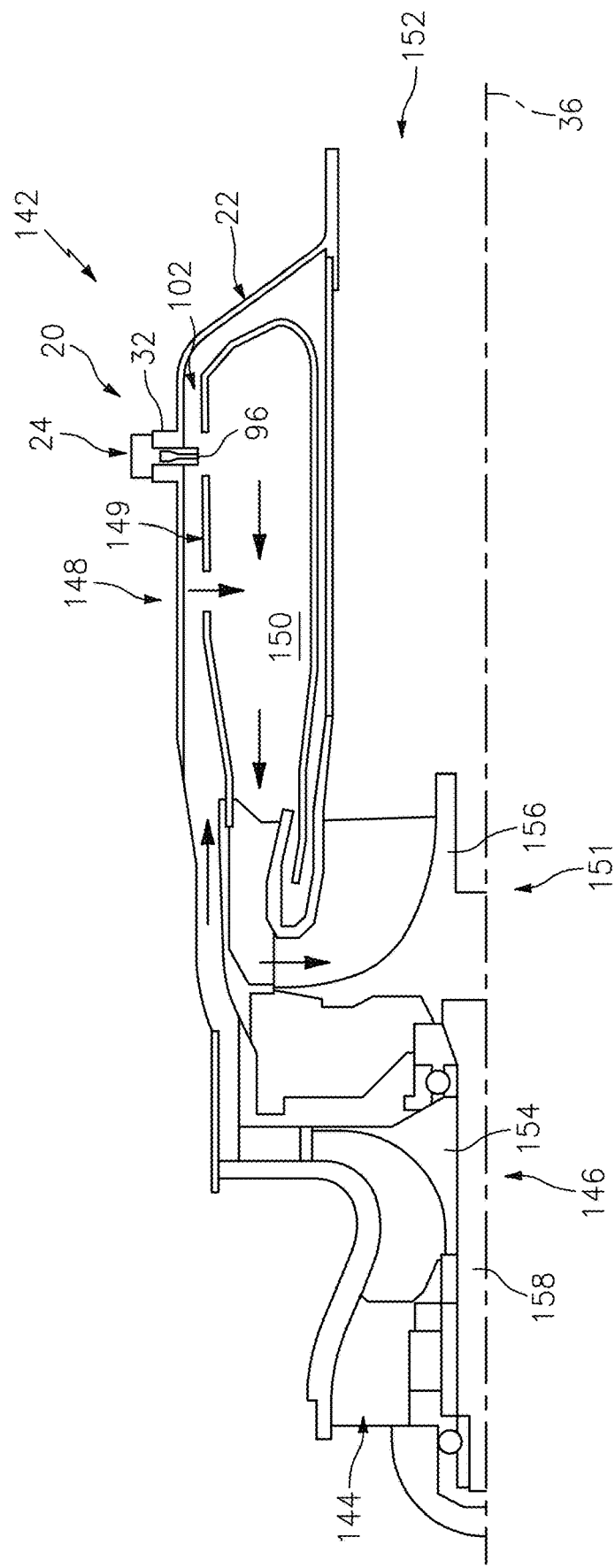
FIG. 18 is a schematic side illustration of a single spool, radial-flow turbojet turbine engine.

FIG. 18 schematically illustrates a single spool, radial-flow turbojet turbine engine 142 with which the engine assembly 20 may be included. This turbine engine 142 may be configured for propelling an unmanned aerial vehicle (UAV), a drone, or any other manned or unmanned aircraft or self-propelled projectile. In the specific embodiment of FIG. 18, the turbine engine 142 includes an upstream inlet 144, a (e.g., radial) compressor section 146, a combustor section 148 with a (e.g., annular) combustor 149 and a (e.g., annular) combustion chamber 150, a (e.g., radial) turbine section 151 and a downstream exhaust 152 fluidly coupled in series. A compressor rotor 154 in the compressor section 146 is coupled with a turbine rotor 156 in the turbine section 151 by a shaft 158, which rotates about the centerline/rotational axis 36 of the turbine engine 142.

The engine assembly 20 may be configured for a gas turbine engine as described above. This gas turbine engine may be configured for propulsion and/or power generation. The gas turbine engine may be a geared turbine engine which includes a gear train connecting one or more shafts to one or more rotors in a fan section, a compressor section and/or any other engine section. Alternatively, the gas turbine engine may be a direct-drive turbine engine configured without a gear train. The gas turbine engine may be configured as a single spool or a multi-spool turbine engine. The gas turbine engine may be configured as a turbofan engine, a turbojet engine, a propfan engine, a pusher fan engine, an auxiliary power unit (APU), an industrial turbine engine or any other type of gas turbine engine. The present disclosure, however, is not limited to any particular types or configurations of gas turbine engines. Furthermore, the engine assembly 20 may alternatively be configured with various other types of internal combustion engines. For example, the engine structure 22 may be configured as a case, a block, a head or another component of a reciprocating piston engine, a rotary engine, or any other type of engine where fuel is continuously or periodically injected into chamber or another internal volume for combustion.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an engine, comprising:
an engine structure comprising a tubular sidewall, an injector aperture, a first fuel supply passage and a second fuel supply passage, the tubular sidewall forming a portion of the injector aperture within the engine structure, the injector aperture extending longitudinally through the engine structure along a centerline, the first fuel supply passage extending laterally within the engine structure to a first supply passage orifice in the tubular sidewall, the second fuel supply passage extending laterally within the engine structure to a second supply passage orifice in the tubular sidewall, the second supply passage orifice separated from the first supply passage orifice by an intermediate portion of the tubular sidewall, and the injector aperture between the first supply passage orifice and the second supply passage orifice;
a fuel injector mated with the injector aperture and arranged between the first fuel supply passage and the second fuel supply passage, the fuel injector comprising a nozzle passage and a nozzle orifice, the nozzle passage extending longitudinally along the centerline within the fuel injector to the nozzle orifice, and the nozzle passage fluidly coupled with the first fuel supply passage and the second fuel supply passage;
the fuel injector including a fuel nozzle, a fuel coupler and an injector mount, the fuel nozzle including the nozzle passage and the nozzle orifice, the fuel coupler within the injector aperture adjacent the first supply passage orifice and the second supply passage orifice, and the fuel coupler configured to fluidly couple the first fuel supply passage with the nozzle passage;
the fuel coupler including a first end wall, a second end wall and a plurality of struts, the plurality of struts arranged circumferentially about the centerline, the plurality of struts connected to and extending longitudinally along the centerline between the first end wall and the second end wall, and the fuel coupler disposed longitudinally between and connected to the fuel nozzle and the injector mount; and
the injector mount forming a solid longitudinal section of the fuel injector configured without any pathways through which fuel may travel;
a first seal element within the injector aperture, the first seal element laterally between and sealingly engaged with the fuel injector and the engine structure;
a second seal element within the injector aperture, the second seal element laterally between and sealingly engaged with the fuel injector and the engine structure; and
a first port in the fuel coupler located longitudinally along the centerline between the first seal element and the second seal element, the first port fluidly coupling the first fuel supply passage with the nozzle passage, and the first port formed circumferentially between an adjacent pair of the plurality of struts.

2. The assembly of claim 1, wherein
the injector aperture extends longitudinally through the engine structure along the centerline between a first end and a second end; and
the first fuel supply passage extends laterally within the engine structure to an intermediate region of the injector aperture located longitudinally along the centerline between the first end and the second end.

3. The assembly of claim 1, wherein the fuel injector is attached to the engine structure by a threaded interface.

4. The assembly of claim 1, wherein the fuel injector is configured to be installed with or removed from the engine structure completely from an exterior of the engine structure.

5. The assembly of claim 1, wherein
the fuel injector includes a base and a head connected to the base;
the base projects longitudinally along the centerline into the injector aperture; and
the head is abutted longitudinally against a surface of the engine structure.

6. The assembly of claim 1, wherein
the fuel coupler includes a plurality of ports and an internal chamber;
each of the plurality of ports is formed circumferentially between a respective adjacent pair of the plurality of struts, the plurality of ports comprise the first port, and the first port is at least partially aligned with the first supply passage orifice;
the plurality of struts are arranged circumferentially around the internal chamber; and the internal chamber is fluidly coupled with and between the plurality of ports and the nozzle passage.

7. The assembly of claim 1, wherein a first of the plurality of struts has an elongated cross-sectional geometry.

8. The assembly of claim 1, wherein
a first of the plurality of struts has and extends along a strut centerline between the first end wall and the second end wall; and
the strut centerline follows a straight trajectory.

9. The assembly of claim 1, wherein
a first of the plurality of struts has and extends along a strut centerline between the first end wall and the second end wall; and
the strut centerline follows a non-straight trajectory.

10. The assembly of claim 1, wherein
the engine is a gas turbine engine; and
the engine structure is configured as a case of the gas turbine engine.

11. The assembly of claim 1, further comprising:
a second fuel injector mated with a second injector aperture in the engine structure;
the second fuel supply passage extending laterally within the engine structure to the second injector aperture; and
the fuel injector fluidly coupling the first fuel supply passage to the second fuel supply passage.

12. An assembly for an engine, comprising:
a fuel supply apparatus comprising a tubular sidewall, an injector aperture, a first fuel supply passage and a second fuel supply passage, the tubular sidewall forming a portion of the injector aperture within the fuel supply apparatus, the injector aperture extending longitudinally through the fuel supply apparatus along a centerline, the first fuel supply passage extending laterally within the fuel supply apparatus to a first supply passage orifice in the tubular sidewall, the second fuel supply passage extending laterally within the fuel supply apparatus to a second supply passage orifice in the tubular sidewall, the second supply passage orifice circumferentially spaced from the first supply passage orifice about the centerline, and the injector aperture between the first supply passage orifice and the second supply passage orifice; and
a fuel injector mated with and extending longitudinally through the injector aperture, the fuel injector comprising a nozzle passage, a nozzle orifice and an internal volume, the nozzle passage extending longitudinally along the centerline within the fuel injector from the internal volume to the nozzle orifice, the nozzle passage fluidly coupled with the first fuel supply passage through the internal volume and the first supply passage orifice, and the internal volume fluidly coupling the first fuel supply passage to the second fuel supply passage.

13. The assembly of claim 12, further comprising at least one of:
a fuel conduit attached to the fuel supply apparatus, the fuel conduit configured to provide fuel to the fuel injector through the first fuel supply passage; or
an engine structure wall, the fuel supply apparatus configured as a boss projecting longitudinally out from the engine structure wall.

14. The assembly of claim 12, wherein
the fuel injector further comprises a fuel injector body extending longitudinally along the centerline between a fuel injector first end and a fuel injector second end, and the fuel injector body includes a mount, a fuel nozzle, a fuel coupler and the nozzle passage;
the mount comprises a threaded exterior;
the fuel nozzle comprises the nozzle orifice, the nozzle passage extends longitudinally along the centerline within the fuel injector body to the nozzle orifice, and the nozzle orifice is disposed at the fuel injector second end; and
the fuel coupler is arranged longitudinally along the centerline between the mount and the fuel nozzle, the fuel coupler comprises a port and an internal volume, the port extends laterally into the fuel injector body to the internal volume, and the internal volume is fluidly coupled with and between the port and the nozzle passage.

15. The assembly of claim 14, wherein
the fuel coupler includes a tubular sidewall extending circumferentially around the internal volume; and
the port extends laterally through the tubular sidewall.

16. The assembly of claim 14, wherein
the fuel coupler includes a first end wall, a second end wall and a plurality of struts;
the plurality of struts are arranged circumferentially about the centerline and the internal volume, and the plurality of struts are connected to and extend longitudinally along the centerline between the first end wall and the second end wall; and
the port is formed circumferentially between a respective adjacent pair of the plurality of struts.

17. The assembly of claim 16, wherein a first of the plurality of struts has a double-tapered cross-sectional geometry.

18. The assembly of claim 12, wherein a width of the first supply passage orifice is less than a width of the injector aperture at an intersection between the first supply passage orifice and the injector aperture.

19. An assembly for an engine, comprising:
an engine structure comprising an injector aperture and a fuel supply passage, the injector aperture extending longitudinally through the engine structure along a centerline, and the fuel supply passage extending laterally within the engine structure to the injector aperture; and
a fuel injector mated with and extending longitudinally through the injector aperture, the fuel injector comprising a nozzle passage and a nozzle orifice, the nozzle passage extending longitudinally along the centerline within the fuel injector to the nozzle orifice, and the nozzle passage fluidly coupled with the fuel supply passage;
the fuel injector including a fuel nozzle and a fuel coupler, the fuel nozzle including the nozzle passage and the nozzle orifice, the fuel coupler within the injector aperture adjacent the fuel supply passage, and the fuel coupler configured to fluidly couple the fuel supply passage with the nozzle passage;
the fuel coupler including a first end wall, a second end wall and a plurality of struts, the plurality of struts arranged circumferentially about the centerline, and the plurality of struts connected to and extending longitudinally along the centerline between the first end wall and the second end wall; and
the fuel coupler including a port formed circumferentially between a respective adjacent pair of the plurality of struts, and the port axially and circumferentially overlapping a portion of a tubular sidewall that forms the injector aperture.

* * * * *